United States Patent [19]

Chao et al.

[11] Patent Number: 5,091,139
[45] Date of Patent: Feb. 25, 1992

[54] AUTOMATED THERMAL LIMIT MONITOR

[75] Inventors: Fred C. Chao, Saratoga; William S. Rowe, San Jose, both of Calif.

[73] Assignee: General Electric Company, San Jose, Calif.

[21] Appl. No.: 371,365

[22] Filed: Jun. 26, 1989

[51] Int. Cl.$^5$ ............................................. G21C 17/00
[52] U.S. Cl. .................................... 376/216; 376/217; 376/236
[58] Field of Search ........................ 376/216, 217, 236

[56] References Cited

U.S. PATENT DOCUMENTS

| | | | |
|---|---|---|---|
| 4,337,118 | 6/1982 | Sakurai | 376/210 |
| 4,774,049 | 9/1988 | Impink | 376/345 |
| 4,839,134 | 6/1989 | Impink | 376/216 |
| 4,975,239 | 12/1990 | O'Neil | 376/247 |
| 4,997,617 | 3/1991 | Newton | 376/216 |
| 5,024,801 | 6/1991 | Impink | 376/217 |

OTHER PUBLICATIONS

Country USA-In-Core Neutron Monitoring System for General Electric Boiling Water Reactors/4/69.

Primary Examiner—Donald P. Walsh
Attorney, Agent, or Firm—Robert R. Schroeder

[57] ABSTRACT

A computed model of reactor power output distribution in space is read periodically to microprocessor based computer memory and retained in memory in a three dimensional matrix. This retention occurs between regular updates on the order of every two minutes. The reactor is conventionally monitored in groups of 16 fuel bundles each. Each 16 bundle group is monitored as to its thermal neutron flux by four vertical strings of local power range monitors, each string having one of four power monitors disposed at four different elevations extending the height of the active core. Each bundle group is controlled by four control rods and is assumed to be subject to uniform flow change with overall reactor flow change. The automated thermal limit monitor (ATLM) takes as inputs all power range monitor information from the BWR reactor core on a continuous basis to two channels one channel for determining operating limits the other channel for determining safety limits. These signals are processed inside the system according to different algorithm requirements for the protection of fuel thermal limits, i.e., minimum critical power ratio (MCPR) and maximum linear heat generation rate (MLHGR). The system also takes as input the on-line absolute core thermal parameters limits, together with a set of built-in parameters called A and B factors which are functions of core power, and control rod position, and the operating thermal limit data at the current power and flow conditions. Based on the above information, the system calculates signal setpoint values for MCPR and MLHGR, respectively. These setpoint values are compared with the instantaneously scanned ATLM signals continuously to determine whether a control rod withdrawal block command or core flow block command should be issued. If an instantaneously scanned and processed ATLM signal value approaches its setpoint, then rod block (or flow block) will be issued. This then assures that the core thermal limits are not violated on rod withdrawal or flow changes. This invention disclosure not only describes the system configuration and functional logic of rod block and flow block, it also describes the design bases of the A and B factors in the system algorithm which are fundamental to the whole ATLM system. The configuration concept, functional logic, and the form and design of the A and B factors constitute the bulk of the ATLM design invention disclosure.

18 Claims, 8 Drawing Sheets

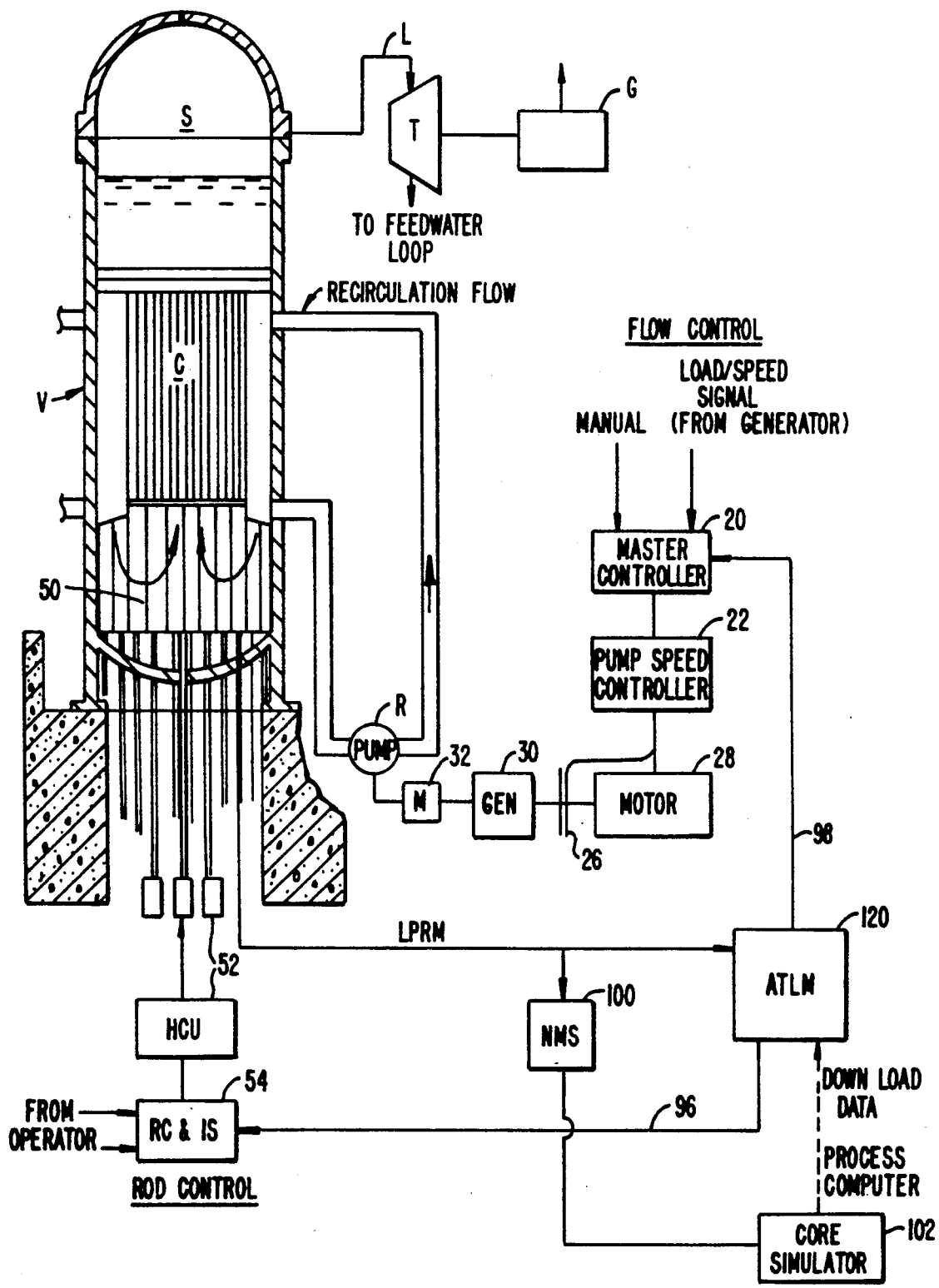
FIG._1.

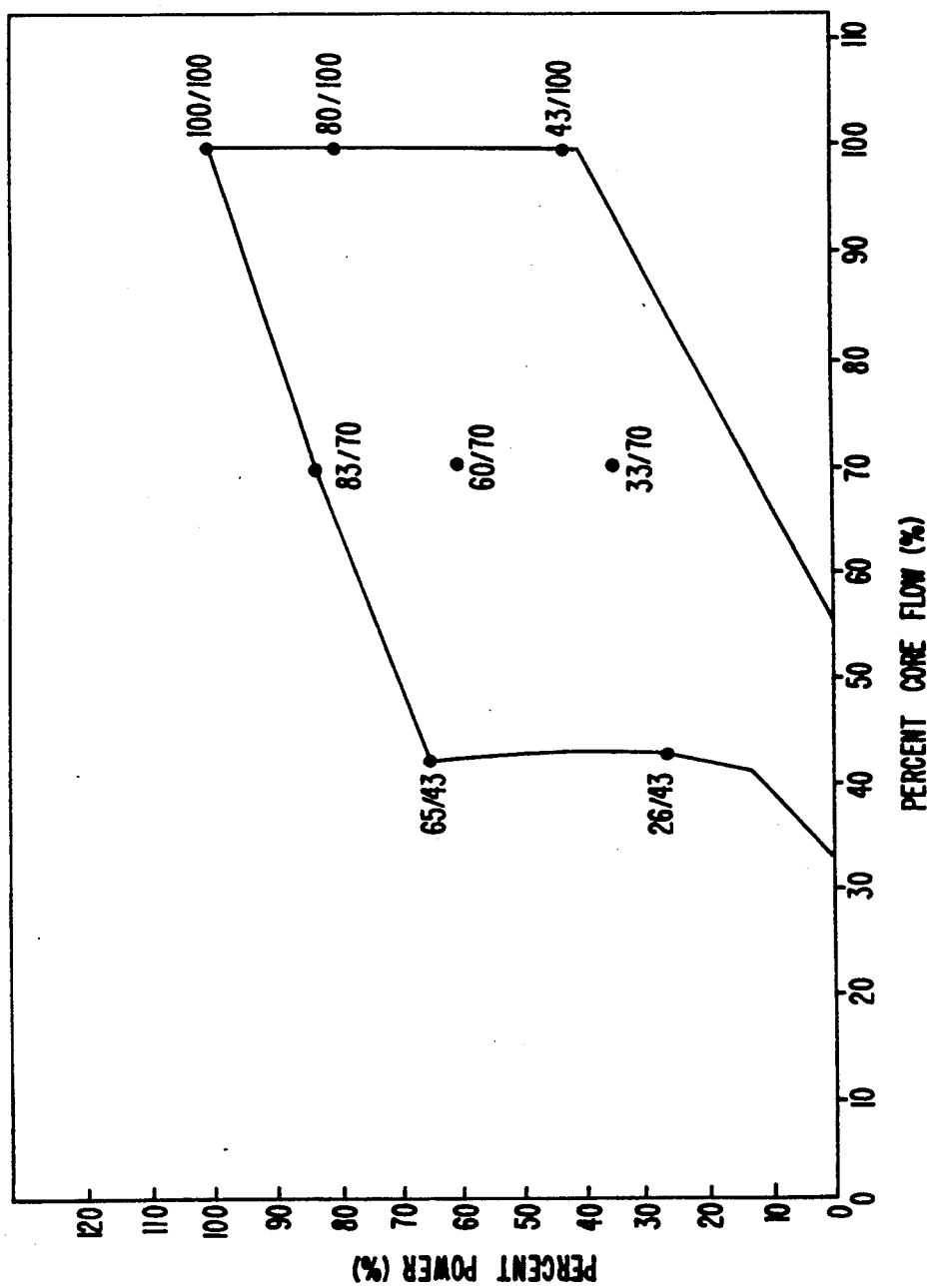
FIG._4A.
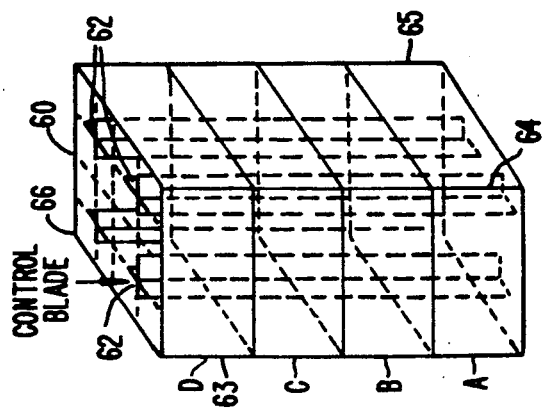
FIG._2.

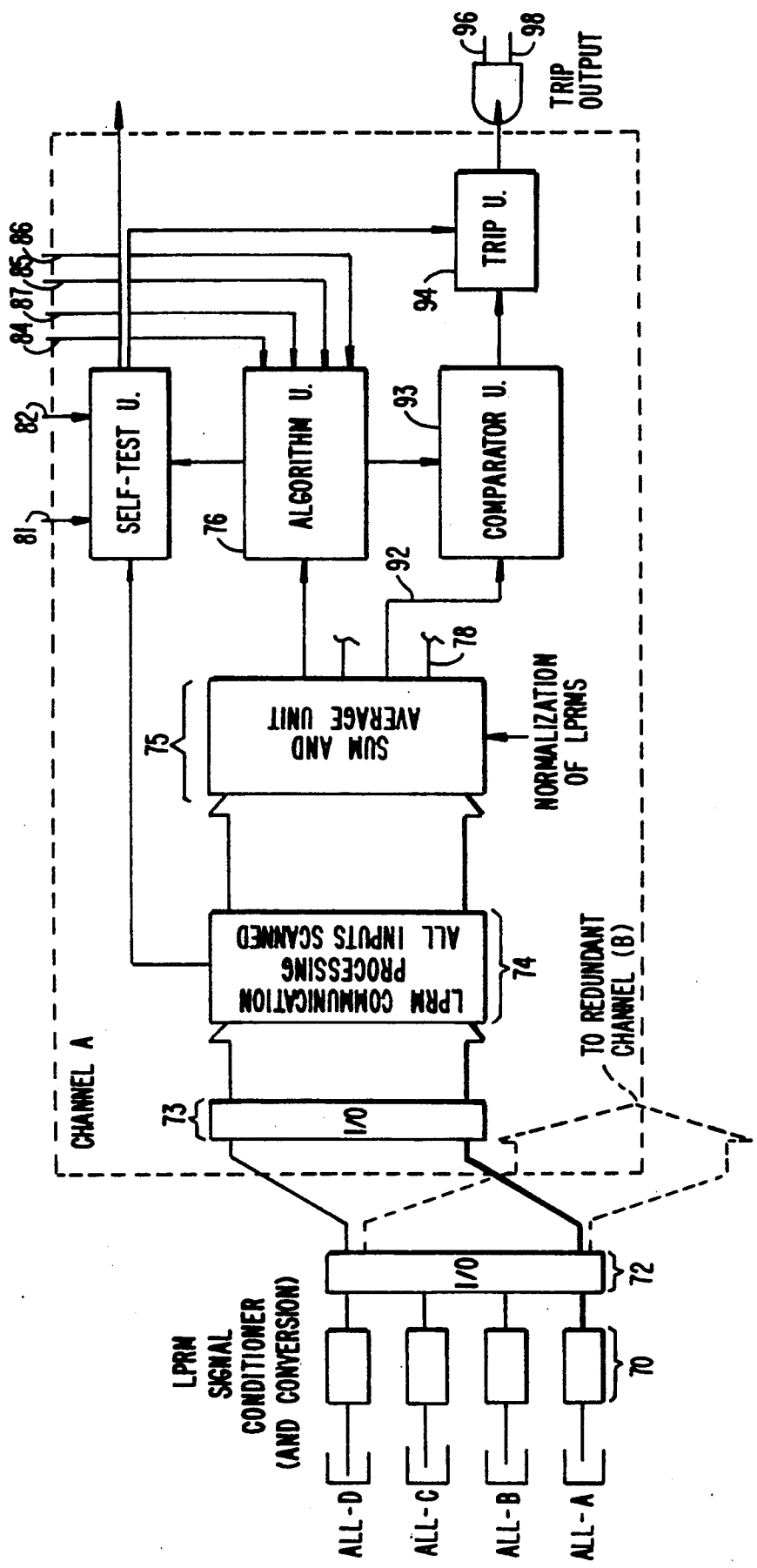
FIG._3.

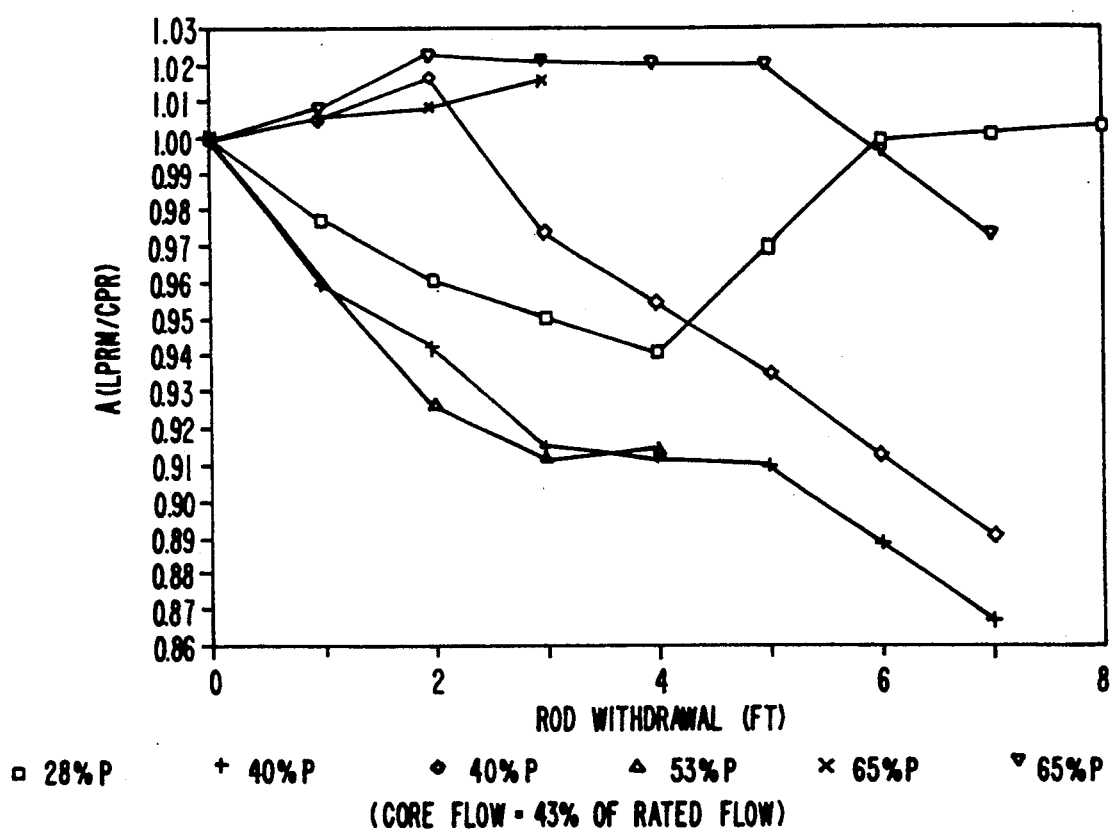
FIG._4B.

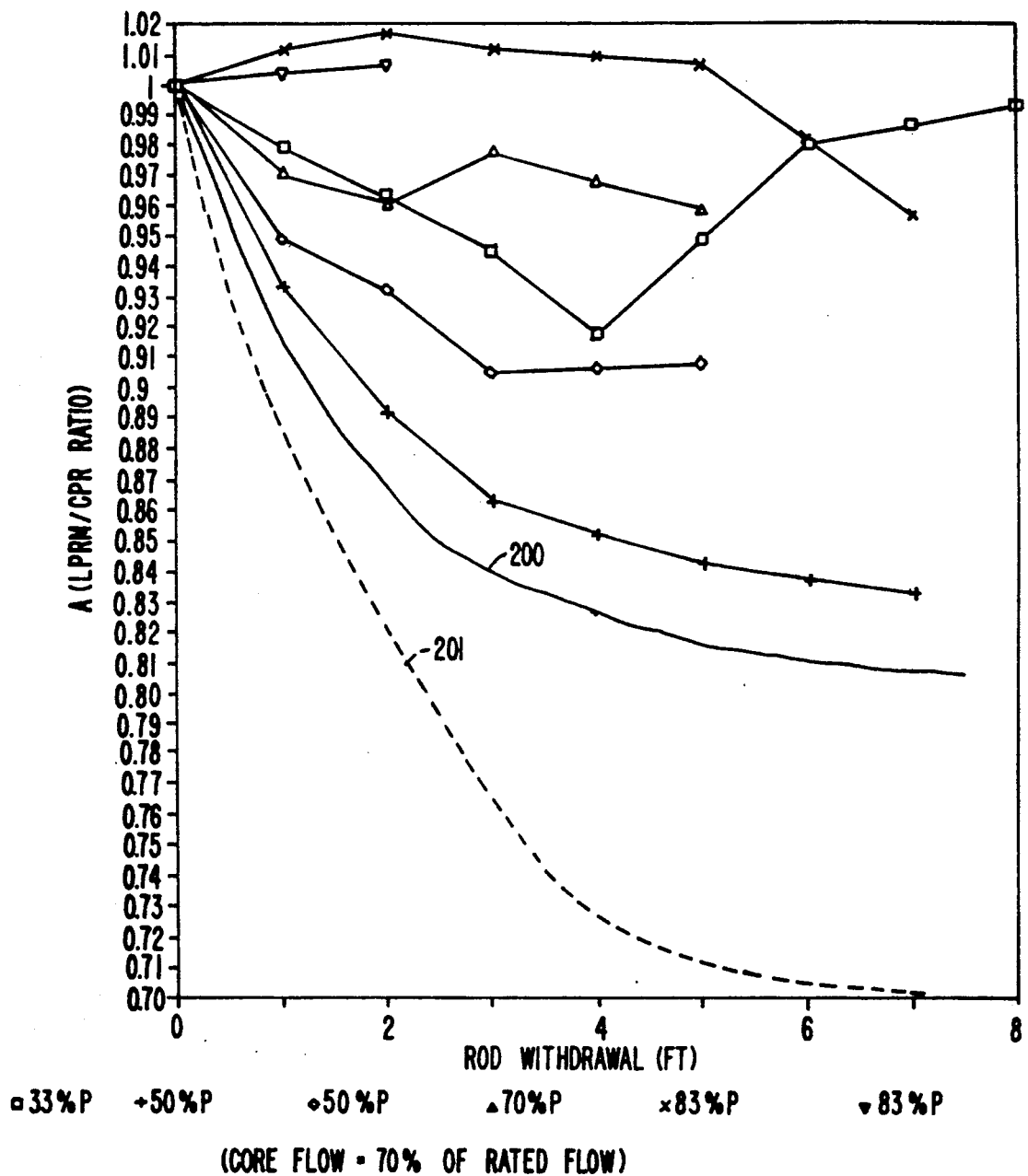
FIG._4C.

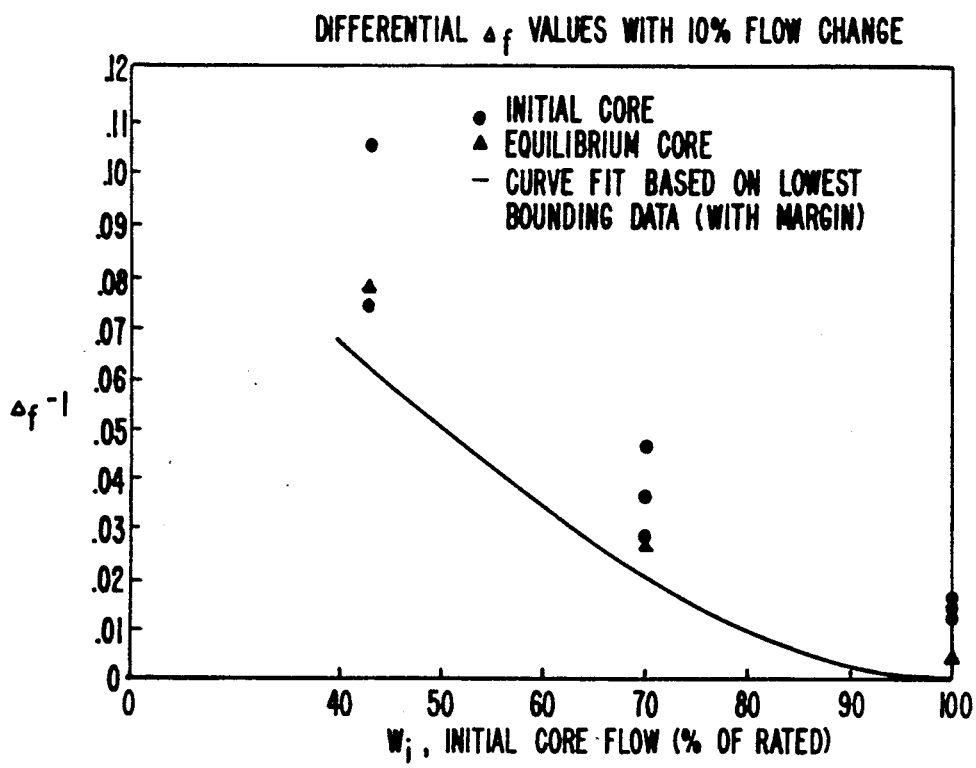
FIG._5A.
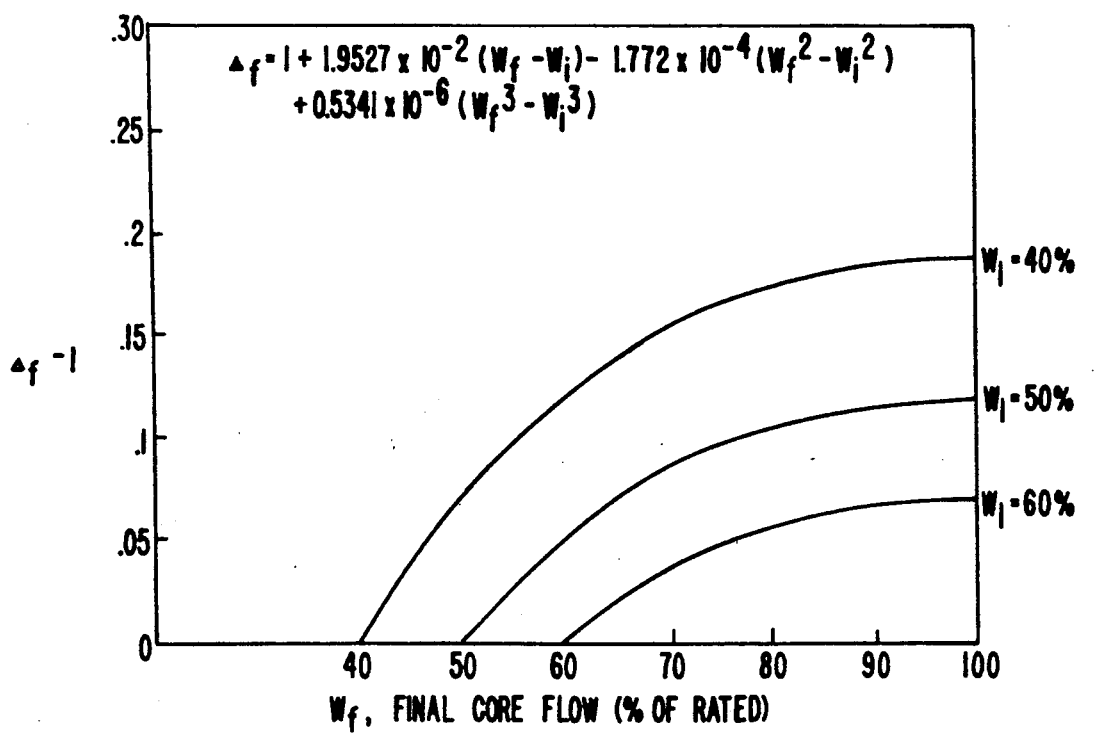
FIG._5B.

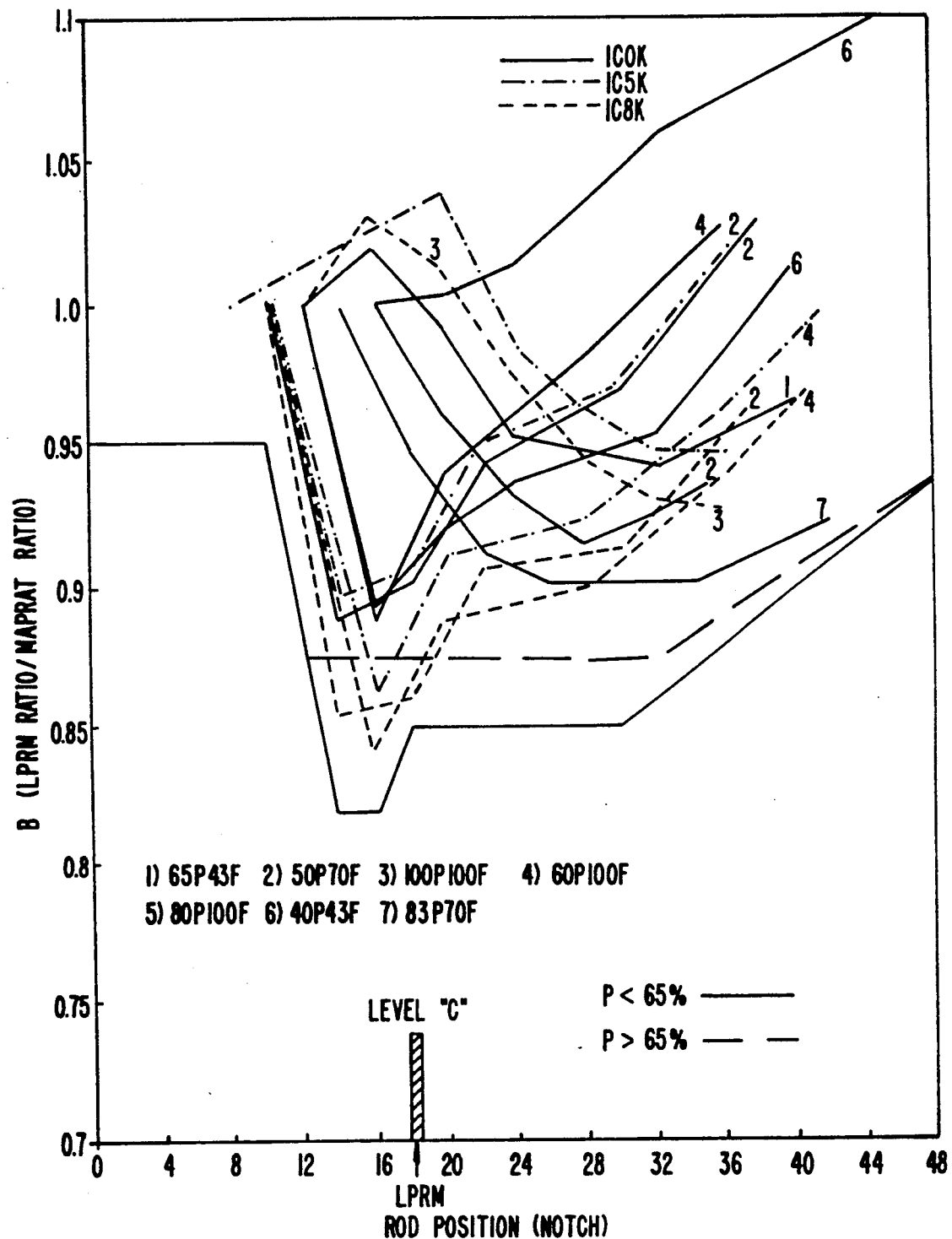
FIG._6A.

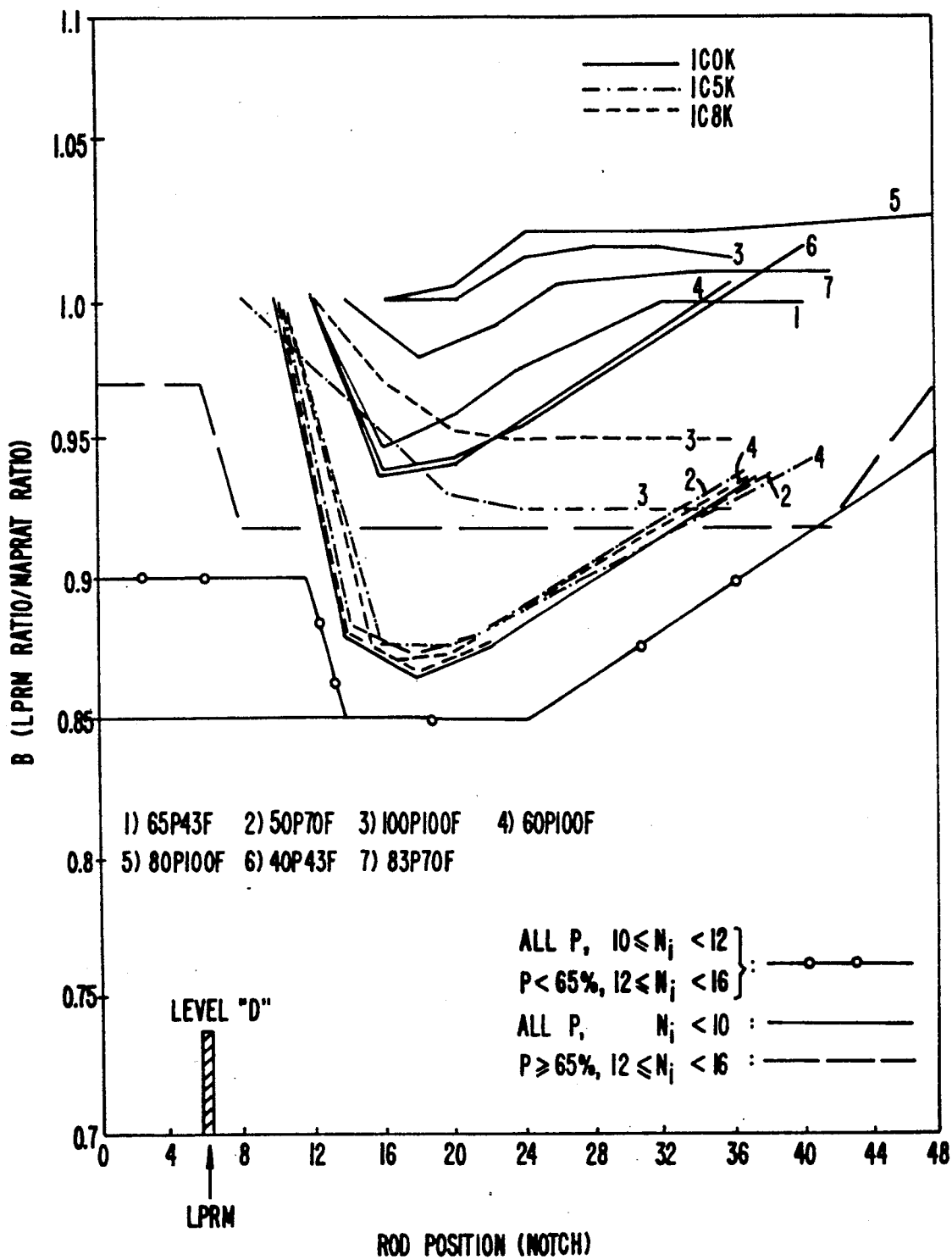
FIG._6B.

AUTOMATED THERMAL LIMIT MONITOR

This invention relates to a thermal limit monitor system for a nuclear power plant. More particularly, an apparatus and process is disclosed for preventing in real time thermal limit violations caused by requested power increases.

BACKGROUND OF THE INVENTION

This invention relates to boiling water nuclear reactors. Such nuclear reactors increase their power output by two well known expedients.

The first of these expedients is the increase in coolant flow through the reactor. Simply stated, increased coolant flow increases the amount of moderator present in the reactor. Fast neutrons from the nuclear reaction are moderated in greater number, promoting additional nuclear fission reactions and power output increases.

Alternately, the nuclear reaction can be controlled by so-called "control rods". These rods when inserted within a reactor core absorb thermal neutrons and inhibit the nuclear reaction. When control rods are withdrawn, less thermal neutrons are absorbed. Instead of being absorbed, the thermal neutrons find their way into the promotion of further nuclear fission reactions. Power output increases, Those having skill in this art will realize that the above description constitutes a gross simplification; this simplification can help in the understanding of materials that follow.

Nuclear fuels are typically arranged in fuel bundles. The fuel bundles themselves contain side-by-side tubes, the tubes being filled, and sealed at both ends with the fissionable material trapped inside. The water coolant in the reactor is relied upon to both moderate the fast neutrons and extract heat from the individual fuel rods. In the absence of the extraction of the heat from the individual fuel tubes, damage to the fuel can occur.

One type of damage that can occur to tubes within a fuel bundle results from a departure from nucleate boiling. In nucleate boiling individual steam bubbles form on the tube surface (at so called bubble nucleation) as heat is transferred to the coolant. As the bubbles rapidly form and leave the tube surface a very agitated coolant condition exists at the tube surface promoting a very efficient heat transfer process—nucleate boiling.

When a departure from nucleate boiling occurs a steam film forms adjacent to the wall of the tube. The steam film is inefficient in extracting heat from the tube. When such a steam bubble forms, it is possible that the metal of the tube can become overheated from the nuclear reaction and the structural integrity of the tube can be lost.

To make absolutely certain that this type of casualty does not occur, all fuel bundles in boiling water reactor configurations are assigned bundle power limits to prevent a departure from nuclear boiling.

Other types of damage to a fuel rod can occur as a result of an overpower condition even while operating in the nucleate boiling regime. The power level of a fuel rod determines the temperature distribution within the rod. A higher power level requires a higher rod operating temperature to drive the nuclear generated heat out of the rod to the coolant. Operation of fuel rods at too high a power level can result in fuel melting or fuel expansion that strains the confining tube the extent that tube failure occurs. These types of rod failure mechanisms depend on the power generated per unit length of fuel rod tube.

A third type of catastrophic tube failure condition is possible during severe loss of coolant accident (LOCA). During a LOCA the moderator coolant is lost between the fuel rod tubes. The loss of the heat transfer medium causes the residual decay heat from the nuclear fuel to rapidly heat up the fuel tubes to high temperatures. At these high temperatures radiation heat transfer between tubes is a significant heat transfer process. It is a characteristic of radiation heat transfer to tend to transfer heat from hotter fuel tubes in the fuel bundle to colder tubes. Thus the peak fuel tube cladding temperature during a LOCA has been found to be limited by controlling the average fuel rod power at each axial elevation of a fuel bundle prior to a LOCA. This is possible because fuel rod residual decay heat power during a LOCA is directly proportional to operating fuel rod power prior to the LOCA.

If fuel tubes become too hot (in excess of approximately 2200° F.), the zircaloy alloy tubing metal chemically reacts vigorously within the steam environment. The chemical reaction releases combustible hydrogen gas and embrittles fuel tube cladding. High temperature cladding has reduced integrity for containing fuel and radioactive materials and is subject to shattering from the thermal shock of rapid cool down when the reactor system is reflooded with water during LOCA recovery. Limits are therefore imposed on the maximum average fuel rod operating power in a fuel bundle at each axial elevation prior to a LOCA, to limit the peak fuel rod tube cladding temperature that could be reached during a LOCA.

The types of operating thermal limits can therefore easily be summarized.

First, since the overall power output of a fuel bundle can result in a departure from nuclear boiling the overall power output of each fuel bundle is monitored to maintain nucleate boiling. The bundle power at which departure from nucleate boiling is predicted to occur, the critical power, is divided by the monitored bundle power and the ratio parameter termed the bundle critical power ratio, CPR. The CPRs of all bundles must exceed unity to prevent a departure from nucleate boiling.

Second, it is of concern that no rod anywhere within a fuel bundle at any point exceed design temperatures. Since fuel rod temperatures are determined by the rod power per unit axial length, operating limits on rod linear power (power per unit length) are established. The operating linear powers of all sections of all fuel rods are effectively monitored and compared to the limits during operation.

Finally, within each fuel bundle the average linear power at each elevation is determined and compared to limits to assure acceptable consequences during a potential LOCA.

The classification of the above thermal limits is also subdivided. A first thermal limit is chosen and denominated as an "operating thermal limit". This operating thermal limit is a limitation of normal day to day steady operation. It is the object of routine nuclear plant operational power increases not to exceed these so-called operating thermal limits. Operating thermal limits include margin allowances for unplanned power increases or heat transfer degradation as might occur during abnormal system transients or accidents.

In addition to the operating thermal limits, there is a second and more stringent limits known as safety thermal limits. The safety thermal limits reside at or near the point where damage to the fuel tubes can occur. Obviously, the goal of plant operation is to remain within operating thermal limits so that safety limits are never violated. Plant instrumentation is provided to assure that operating and safety limits are not violated on operator initiated power increases by core flow increases and control rod withdrawal.

SUMMARY OF THE INVENTION

In a boiling water reactor, the power output of the reactor is monitored by conventional local power range monitors. Preferably, these local power range monitors each measure the amount of thermal neutron flux present and output proportional electrical signals. These electrical signals give the power range of the reactor in the vicinity of the monitor.

In a boiling water reactor, monitors are distributed throughout the whole reactor core in vertical strings. Each vertical string has a group of typically four power monitors attached to it. These power monitors are spaced in elevation such that the whole boiling water reactor core can be monitored both in columns and in rows.

For purposes of both the prior art monitoring of the reactor and the monitor here, the reactor is subdivided into square columnar blocks of 16 fuel bundles in each block. For each block, there are assumed to be four monitor strings located at the four corners of the block. As there are four local power range monitors on each string and these local power range monitors are spaced equally vertically, the region is covered by a total of 16 local power range monitors.

A region of such fuel bundles is controlled by four discrete control rods. If any or a combination of the four discrete control rods is withdrawn, the neutron flux increases, and thus the power will increase. Such power increase will be indicated on an immediate basis by the local power monitors. In prior automatic fuel protection instrumentation schemes, the prevention of exceeding thermal limits has been confined to the withdrawal of control rods with mandatory human supervising action required to maintain operating limits. Increases in flow that would violate operating or safety limits have not been automatically monitored and censured. Instead the reactor core is constrained to operating thermal limits at reduced core flows such that the power increase associated with a core flow increase to maximum system capability will not result in a violation of fuel safety thermal limits. Thus operator errors or flow control system failures that could result in violating of operating limits, but not safety limits, are recognized. The design philosophy which allows the unplanned short duration violation of operating limits relies on the small likelihood of an additional concurrent abnormal transient or accident event which could cause further degradation to violate safety limits. Sufficient instrumentation inputs are provided to the plant process computer such that the reactor operator is periodically provided a complete picture of the performance of reactor fuel in relationship to established operating limits. There is, however, no automatic enforcement of compliance to fuel thermal operating limits.

The current situation is similar for operator initiated power increases by control rod withdrawal. Established operating limits assure that a single erroneous control rod withdrawal will not degrade fuel performance from operating limits to a safety limit violation. However, in this instance complete control rod withdrawal is not covered by the established operating limits. The local power increase associated with the completed withdrawal of some limiting control rods is so high that to do so would require very restrictive operating limits that could sometimes require reactor total power to be restricted below the design level in order to meet the requirement. Instead, during control rod withdrawal an automatic monitoring system is provided which utilizes the local power monitor signals as input to override the operator requested control rod withdrawal (viz. block further withdrawal) as necessary to assure fuel safety limits are not violated assuming withdrawal is initiated with fuel near the control rod on operating thermal limits.

In current boiling water reactor (BWR) nuclear power stations, the analogous monitoring device is called a rod block monitor or RBM. The RBM uses the in-core power (neutron flux) monitors for its basic monitoring information source.

The core power and thermal limit status then can be related by processing the readings of the local power monitors. The 16 local power monitors of each four corner strings are assigned to two channels in the prior art RBM: the bottom (A) and above the mid-plane (C) detectors in one channel, and the top (D) and the below the mid-plane (B) detectors in another channel. The average of the (typically 8) detector inputs in each channel forms an RBM signal. Block/Alarm occurs when the signal exceeds a preset setpoint. The RBM rod block setpoint to prevent safety limit violation is determined based on a theoretical core power and thermal limit calculation response prior to the beginning of each fuel cycle (i.e., the period between reactor refuelings).

The calculation is based on the assumption that initially the core is operating at the operating limit, and that a rod withdrawal error is initiated from a hypothetically worst control rod pattern which gives the worst thermal limit change with control rod withdrawal. With such a continuous rod pull, the relative amount of RBM channel output increase which is accompanied by a thermal limit change from the operating limit to the safety limit is defined as the rod block setpoint. This rod block setpoint is thus dependent on assumed conservative initial conditions. Typically this setpoint is determined only for the rated power rated flow condition. Consequently, this current method is not based on comprehensive study of the correlation between thermal limit change and RBM signal change, and does not consider the true existing absolute thermal margins of the core. Experience has shown that current RBM setpoints restrict (block) control rod withdrawal much more often than necessary and is conservative.

However, it can be seen that with such a system based upon the assumption of initial operation within an operating limit, that defeat of the safety system would be possible. Simply stated, by making assumptions of operation within thermal operating limits in succession and requesting rod withdrawals in succession, multiple sequential requests could cause violation of the thermal limits.

However, since conservative values between instrument response and core power increase are normally chosen, these conservative values while assuring and contributing to the remarkable safety record of nuclear power plants to date, unnecessarily inhibit operation of the plant in maneuvering from a low power state to a higher power state.

Further, since the effects of flow increase are ignored in such rod blocks, a level of automatic safety precaution is omitted which would be desirable to include.

It should be understood that nuclear reactors can be continuously monitored by online computers. Typically, these online computers recurrently put together three dimensional core thermal performance profiles which accurately predict both the thermal state of the core as well as the local power range monitor readings. Unfortunately, even though such computations are now performed by modern fast computers in the order of once every two minutes, they are insufficient in their speed to provide "real time" rapid response predictions of the consequences of planned reactor flow or control rod position changes relative to fuel thermal limit performance. Accordingly, there is a need for an automated thermal limit monitor which will inhibit in real time requests made for increased power that would violate either operating or safety limits, whether it be based upon rod withdrawal or increases in coolant flow.

SUMMARY OF THE INVENTION

A computed model of reactor power output is read periodically to computer memory and retained in memory in a three dimensional matrix. This retention occurs between regular updates on the order of every two minutes. The reactor is conventionally monitored in groups of 16 fuel bundles each. Each 16 bundle group is monitored in real time as to its thermal neutron flux by four vertical strings of local power range monitors, each string having one of four power monitors disposed at four different elevations extending the height of the fuel in core. Each bundle group is controlled by four control rods and is assumed to be subject to uniform flow change with overall reactor flow change. The automated thermal limit monitor (ATLM), takes as inputs all power range monitor information from the BWR reactor core on a continuous basis to two channels, one channel for determining operating limits, the other channel for determining safety limits. (Redundant functional configurations can be implemented in each channel if desired for increased reliability but is not assumed in the reference configuration discussed.) These signals are processed inside the system according to different algorithm requirements for the protection of fuel thermal limits, i.e., minimum critical power ratio (MCPR) and maximum linear heat generation rate (MLHGR). (Extension of the MLHGR procedures discussed to the singular maximum average planar linear heat generation thermal limit parameter (MAPLHGR) is straight forward.) The system also takes as input the on-line absolute core thermal parameters limits, together with a set of built-in parameters called A and B factors which are functions of core power and control rod position, and the operating thermal parameter limit (or safety limit) at the current power and flow conditions. Based on the above information, the system calculates signal setpoint values for MCPR and MLHGR, respectively. The ratio of the instantaneously scanned power monitor value to that value at some initial state forms the ATLM signal. These setpoint values (normalized to some initial state) are compared with the instantaneously scanned ATLM signals continuously to determine whether a control rod withdrawal block command or core flow block command should be issued. If an instantaneously scanned and processed ATLM value approaches its setpoint, then rod block (or flow block) will be issued. This then assures that the core thermal limits are not violated on rod withdrawal or flow increases.

This invention disclosure not only describes the system configuration and functional logic of rod block and flow block, it also describes the design bases of the A and B factors in the system algorithm which are fundamental to the whole ATLM system. The configuration concept, functional logic, and the form and design of the A and B factors constitute the bulk of the ATLM design invention disclosure.

An object of this invention is to disclose a system for blocking requests for core power increase in real time based upon a current model of the reactor thermal profile.

An advantage of the disclosed process and apparatus is that it is applicable both to requests for rod withdrawal and to requests for flow increase.

An additional advantage is that manipulation of the plant can include rod blockage when operating thermal limits versus safety thermal limits are in danger of violation. No longer is it required to have a system for monitoring requests for increased power theoretically issuing block orders based upon safety limits.

A further advantage of the disclosed system is that it can be utilized in a backup module to monitor and block requests for power increase when safety limits are approached. It is ideal for the high degree of operating safety redundancy required in nuclear plants.

An additional advantage of the disclosed system is that the operator is assisted in real time of avoiding violation of operating thermal limits. This avoidance of violation is based upon the absolute and current operating thermal state of the reactor. Consequently, the operator is assisted in achieving optimized radial and axial power shapes during power ascension to rated condition throughout rated power operation.

Yet another advantage of this invention is that since the system is based on actual online local power range monitor results, the reactor can be operated with better flexibility within its thermal limits. Since blockages only occur based upon the difference between the actual operating state of the reactor and the requested power increase, overly conservative practices relating to local power range monitor output are no longer required. The disclosed protocol within its metes and bounds assures operation within the operating thermal limits.

Summarizing the functional operational objectives of the system it will be found that the disclosed system:

a) Adapts core thermal limit information from the plant process computer and the local power information from the NMS (Neutron Monitoring System). to perform comparisons based on its own algorithm independent of the process computer, and to issue rod block (or flow block) commands when the absolute operating thermal limit is approached. In the event the operating limit rod block function fails, a backup module will issue a rod block command when the safety limit is approached.

b) Through rod block function and estimated thermal limit by the ATLM, the operator is assisted not only in avoiding violation of operating thermal limit but also in achieving optimized radial and axial power shapes during power ascension to rated condition and throughout rated power operation.

c) Utilizes actual on-line core monitor results for better flexibility in rod withdrawal maneuvers. With ATLM, the rod(s) can be withdrawn until the operating limit is reached.

d) With its independent protection algorithm which is based on absolute core thermal limits, the ATLM allows for automated control rod operation. The RBM will not be able to allow for automated control rod operation because it is not based on absolute core thermal limit and it assumes the core is always on or having a margin from the operating limit. Consequently, it cannot automatically provide the operating limit protection the ATLM can for automated control rod operation where repeated requests are made to withdraw a control rod that would result in a thermal limits violation if allowed to proceed if only RBM is used.

BRIEF DESCRIPTION OF THE DRAWINGS

Other objects, features and advantages will be more apparent after referring to the following specification and attached drawings in which:

FIG. 1 is a schematic of a nuclear reactor illustrating schematically the coolant flow cycle and apparatus for blocking control rod withdrawal, these apparatus being actuated as a post operative step by the monitor process and apparatus algorithm herein set forth;

FIG. 2 is a schematic illustrating a typical group of 16 fuel bundles within a reactor core and schematically showing the location of four control blades and the local power range monitor array;

FIG. 3 is a schematic of the ATLM microprocessor circuitry:

FIG. 4A is a power flow diagram illustrating the domain of specific powers and flows possible for a given reactor: it also shows the operating states that form the calculation database for the ATLM parameters, A, B factors:

FIG. 4B is an exemplary plot of varying "A Factor" constants for different rod withdrawal steps of various rod groups at preselected power rates to illustrate determined variation encountered in a typical reactor, core flow being a constant value in this plot:

FIG. 4C is a second exemplary plot constants similar to those illustrated in FIG. 4B, these being bounded by a "worst case" curve, this curve being utilized for constant determination for an aspect of this invention:

FIG. 5A illustrates the optimum constant, differential change in flow A factor, utilized for flow change in flow block algorithm;

FIG. 5B illustrates curves quadratically solved for changes in core flow, these curves being rapidly solvable on microprocessors: and, FIGS. 6A and 6B illustrate families of curves utilized for linear power generation rates, these curves being applicable for determining computation constants (B-factors) at preselected local monitor points and preselected elevations of control rod withdrawal along all tubes in any group of bundles at various power and flow conditions; FIG. 6A is specific for LPRM at "C" elevation; FIG. 6B is specific for LPRM at "D" elevation.

DETAILED DESCRIPTION OF THE PREFERRED EMBODIMENTS

Referring to FIG. 1, the environment in which this invention resides can be easily understood. A reactor vessel V having a core C generates steam. Steam S passes outwardly on a line L to a main turbine T. As is conventional, turbine T drives a generator G which generator produces electrical power.

Discharge of steam occurs to a condenser cooled by coolant (not shown). A system of pumps including a feedpump take the condensate and inject it back into the reactor vessel V where the steam cycle endlessly repeats. (Also not shown)

As is common in nuclear reactors, a recirculation pump R is utilized. Typically, the recirculation pump R circulates the water coolant through the core C. As is well known, such circulation is included in peripheral downcomer volumes along the sidewalls of vessel V and reverses flow to pass centrally upward through core C.

The coolant has two purposes.

First, it acts as a moderator. In acting as a moderator it increases or decreases power.

Second, the coolant removes fuel heat and turns itself into steam S which drives turbine T.

Having set forth the moderator flow path and the steam cycle in over simplified format, attention can now be directed to the reactor control.

Regarding the recirculation of fluid by pump R, a master controller 20 is utilized. Master controller receives a load speed signal from generator G (by conduits not shown). Additionally, it can receive a manual input.

Receiving one or both of these inputs, master controller 20 has an output to pump speed controller 22. Pump speed controller 22 acts upon a clutch 26 between a motor 28 and a generator 30. Generator 30 controls a motor 32 driving the recirculation pump R. It will be understood that the particular control used for the variable throughput of pump R can vary, and also that in another configuration multiples of pump R and motor 32 can be located directly within and below the downcomer volumes of vessel V.

Likewise, the function of the control rods can be summarized in a simplified format. Typically, a group of control rods 50 are actuated by hydraulic control units (HCU) 52. These control units include precision position monitors for maintaining the rods in given positions of penetration to the core for both the shaping of the core reaction as well as its overall control.

The hydraulic control units 52 are in turn activated by a rod control and information system (RCIS) 54. This rod control and information system includes inputs from the operator and outputs to the operator indicating the positions of each of the rods.

Referring to FIG. 2, a section of core C is illustrated. Typically, this section includes 16 bundles 60 controlled by four control blades 62. The reader will realize that core C consists of several hundred bundles 60 with many such control rods, there being generally four control rods 62 for each group of 16 bundles.

The control rods are raised into the core C and lowered from the core C by the hydraulic control unit 52, these units being below the reactor vessel V. It is this control rod movement which effects reactor operation.

Simply stated, when the control rods are inserted, fission reaction is inhibited. When the control rods are withdrawn, fission reaction increases.

Each group of 16 fuel bundles is monitored by 16 local power range monitors (LPRMs). Local power range monitors are typically mounted in strings in assemblies extending the vertical length of the core. In FIG. 2, four such strings 63, 64, 65, and 66 are shown.

Each string includes four discrete power monitors. These power monitors are shown as A, B, C and D. It will be seen that monitors D are near the top of the core and monitors A are near the bottom of the core. Monitors B and C monitor the medial levels of the core.

For the purposes of the application, it will be understood that monitoring occurs against three broad classifications of limits.

First, each bundle is examined for its overall power output. It will be understood that the constant "A" which follows in this description is utilized in this function.

Second, each individual fuel rod contained in any of the fuel bundles is monitored for its linear power generation.

Finally, a planar averaged linear heat generation rate is monitored for each bundle at various fuel planes.

For these last two considerations, it will be understood that the constant "B" which follows in this description is utilized.

As will hereinafter be more fully developed, it has been found that the ratio of maximum linear heat generation rate in the fuel rods and the ratio of planar average heat generation rate at any one fuel plane of each bundle are analogous. This being the case, the constant "B" as hereinafter described can be used as a generic input to the algorithm protecting against these limits.

Brief reference to FIG. 3 can be made. This reference is a schematic which sets forth the processor apparatus of this invention. Simply stated, each of the local power monitors A, B, C, and D passes its signals through a signal conditioner 70 and thereafter to a bank of optical-isolators 72. The optical-isolators input to an input/output bus 73 which bus communicates signal to the local power range monitor processing bus. Utilizing this bus, all inputs throughout the reactor in the order of 200 are scanned by the processor unit.

This scanning occurs in the processing unit denominated at block 74.

Thereafter, and as appropriate for each monitor block of 16 bundles, the sum and averages of the local power range monitors are computed at block 75.

Once this has occurred, two microprocessor outputs are utilized. A first output at 76 goes to an algorithm microprocessor, which microprocessor processes for the so-called operating limits setpoints.

A second output 78 goes to an algorithm microprocessor unit which unit is not shown and is identical to that illustrated connected at 76. This microprocessor process for so-called "safety limits" and furnishes the degree of redundancy and backup protection that this disclosure enables.

Having set forth the overall architectural schematic, the specific inputs can be set forth. At 81, into a self-test unit are placed the plant parameters. Additionally, at 82 a set point result from an optional identical redundant channel is put through for cross channel comparison check.

The algorithm unit receives through 84 a reference APRM which represents the reactor power level, at 85 a core simulator thermal limit output, at 86 a rod position indication. Input 87 includes applicable core flow data from recirculation pump R (see FIG. 1).

The algorithm unit computes a set point. This set point is compared at comparator 93 to actual instantaneous local power range monitors based signals 92. When the reading from the actual power range monitors exceeds the set point, trip unit 94 issues a trip order. The trip order then proceeds from the automated thermal limit monitor along two conduits 96, 98.

Referring back to FIG. 1, conduit 96 blocks all further rod insertions. Additionally, and as seen further in FIG. 1, conduit 98 blocks any further attempts to change core flow.

As has been emphasized, it is known to have core simulator. This core simulator receives input from a neutron monitoring system 100 and constructs in a large, fast computer 102 a model of the overall reactor operation. This model of the overall reactor operation can be predicted on a time basis approaching once every two minutes by modern high speed computation equipment. This calculation result of core thermal limits is downloaded into a memory in the automated thermal limit monitor system 120. Based on these core thermal limits, the algorithm unit computes and outputs setpoints.

This computation occurs to the unit in real time, in a very short calculation cycle on the order of 0.1 to 0.2 seconds.

Having generalized this system, a detailed discussion of the algorithms herein utilized can now be set forth.

Component Arrangement

The ATLM system signal processing and logic diagram as shown in FIG. 3 can be conceptually summarized.

The ATLM takes all LPRM detector readings as inputs. All LPRM signals are fed into two redundant channels of the ATLM by first passing through an analog to digital converter and sets of optical communication links. For each channel, after the LPRMs pass through the scan/process unit, they then pass through a summing and averaging circuit unit. Except for the peripheral region of the core, every square block of 16 fuel bundles are monitored by the four LPRM strings at the four corners of this block. For minimum critical power ratio (MCPR) limit monitoring, the sum of the average of each level of B, C, D, of the four LPRM strings is used to monitor the MCPR among these 16 bundles. For peripheral bundles where only three or two LPRM strings are available, specific but similar assignment methods are used. Thus, the readings of each LPRM string are used four times to provide the sum and average outputs for the four different but neighboring block regions of fuels for each of the two ATLM channels.

The initial regional MCPRs of every block of 16 bundles calculated by the process computer core simulator/monitor are selected and downloaded in the algorithm unit memory in matrix form for comparison. For the power density limit (KW/FT) algorithm, the average reading of each of the four levels is used separately for monitoring local power densities in the four vertical sections of the 16 bundle block. These four vertical section correspond to the four LPRM levels, (see FIG. 2)

The processed LPRM readings that cover each and every region of the core are read to both the comparator unit and the algorithm unit in matrix form. The algorithm unit takes as inputs the reference APRM value (as reactor power), the selected rod identification and its position from the RCIS, the core flow, and the regional thermal limit data from the core monitor.

The algorithm unit then performs setpoint calculations for every region, separately for operating thermal limit and safety thermal limit setpoints in different subunits. The calculated setpoint data then pass to the comparator unit where they are compared against the instantaneous LPRM data from the sum/average unit for each monitoring region. Rod block signal is issued if the instantaneous LPRM output from any one region exceeds the setpoint output of that region.

A separate set of units that issues flow block signal is also included in both channels. Flow block signal will be issued if MCPR limit or KW/FT limit is approached during flow change. A separate self-test unit is included in each channel to issue test command and to perform processor calculation verification and monitor calculation verification.

System Algorithm

Algorithm to Prevent MCPR Limit Violation During Control Rod Withdrawal

The equations that govern the relationships between the thermal limits and the processed LPRM sum outputs are as follows, for each monitoring region:

$$\frac{RBS_o}{LPRM_i} = A_o \times \frac{RMCPR_i}{OLMCPR} \quad (1)$$

$$\frac{RBS_s}{LPRM_i} = A_s \times \frac{RMCPR_i}{SLMCPR} \quad (2)$$

where:
$RBS_o$: Operating limit rod block setpoint
$RBS_s$: Safety limit rod block setpoint
$LPRM_i$: Initial sum of average of four LPRMs from B,C,D levels of the four LPRM strings that surround each 16-bundle region, (or of available LPRMs for corresponding peripheral region.)
$A_o$: Margin factor for operating limit rod block, a known function of rod pull distance.
$A_s$: Margin factor for safety limit rod block, a known function of rod pull distance.
$RMCPR_i$: Regional initial minimum CPR, i.e., the minimum CPR of the 16 bundles in the region spanned by the four LPRM strings, (less than 16 bundles for peripheral regions.) Known inputs from core simulator/monitor.
OLMCPR: Operating limit MCPR in current cycles, a known function of power and flow.
SLMCPR: Safety limit MCPR in current cycle, a known bounding value for all power and flow conditions.

The above algorithm is derived assuming no flow change.

Basis of Algorithm

The critical power ratio (CPR) is related to the critical quality ($X_c$), bundle power (P) and channel flow (W) as follows:

$$CPR = \frac{X_c}{P/W} \times \text{Constant}$$

For two different power conditions, $$\frac{CPR_{limit}}{CPR} = \frac{(P/W)}{(P/W)_{limit}} \cdot \frac{X_{c\;limit}}{X_c}$$

or $$\frac{P_{limit}}{P} = \frac{CPR}{CPR_{limit}} \times \frac{W_{limit}}{W} \times \frac{X_{c\;limit}}{X_c}$$

Assume the flow change caused by control rod withdrawal is very small. Also, if there is no adjacent rod withdrawal, assume $X_c$ change is negligible, $$\frac{P_{limit}}{P} = \text{Constant} \times \frac{CPR}{CPR_{limit}}$$

where $$\text{Constant} = \frac{W_{limit}}{W} \cdot \frac{X_{c\;limit}}{X_c} = 1$$

If there is axial power peaking shift caused by adjacent rod motion, then $$\frac{P_{limit}}{P} = K_a \cdot \frac{CPR}{CPR_{limit}} \quad (6)$$

where $K_a$ is the coefficient to account for axial power peaking shift.

Assume $$\frac{LPRM_{limit}}{LPRM} = C \times \frac{P_{limit}}{P} \quad (7)$$

Consequently, $$\frac{LPRM_{limit}}{LPRM} = C \times K_a \times \frac{CPR}{CPR_{limit}}$$

or, $$\frac{LPRM_{limit}}{LPRM} = A \times \frac{CPR}{CPR_{limit}}, A = C \times K_a \quad (8)$$

where $A$ = Function (power, flow, rod pull distance)
for fuel region with rod movement $A = 1$
for fuel region with no rod movement (The above equation assumes no flow change.)

Determination of A-factor

The A-factor correlates bundle MCPR ratio to integrated LPRM ratio through combined relationships between MCPR to bundle power and bundle power to LPRM value. The construction of bundle power from LPRM readings is a major calculation task in the plant process computer model, where large amount of coefficients and data are used in lengthy calculations. In order to establish a simple relationship between measured LPRMs and "absolute" bundle power and corresponding MCPR that involves very few input data and calculations, as required by quick on-line monitoring and control purpose, an approximation method is used. This method is to construct an A-factor curve dependent only on a very few parameters, that is based on statistical interpretation of semi-empirical results from exact core physics calculations at various conditions.

In order to obtain A-factor curves from rod withdrawal cases at various operating conditions, a family of operating power and flow conditions with corresponding typical rod patterns are developed in advance. These families of operating power and flow conditions are selected from spaced apart operating flow and power levels contained within the bound of the total universe of power and flow condition. This universe of power and flow conditions is illustrated in FIG. 4A.

Six selected positions of power and flow specifically analyzed are shown. These are shown for core flows of 43% FIG. 4B and 70% FIG. 4C. Rod withdrawal cases with rods of higher worth are developed based on these initial conditions. Based on the highest rod worth and largest size of rod gang for rod withdrawal a family of A-factor curves are developed for various power and flow conditions and at different core cycle conditions. With the above data base, a proposed statistical A-factor curve for operating limit rod block algorithm for a typical 1100 MW reactor is shown at 200 in FIG. 4C. This is the curve of one-sided A-factor values at 95% probability at 50% confidence (best estimate) using the current data base of various A-factor data and assuming a normal distribution of the data, and with the following assumptions:

a) Highest worth gang rod withdrawal cases (i.e., highest worth rods which has a gang size of eight rods) based on typical rod pattern at various power and flow conditions.

b) Data included both initial core and equilibrium cycle conditions.

c) Equilibrium Xenon initially and constant Xe during rod withdrawal.

d) An average 15% random LPRM failure rate is included in developing the 95/50 bounding value.

Based on the similar method, another set of A-factor curves is developed for any rod which is at least half way withdrawn from the core since the last core monitor update. By implementing this additional set of A-factor curves in the algorithm, the conservatism in A-factor for rods more than half withdrawn can be reduced significantly.

Bounding A Factor for SLMCPR Protection

The limiting rod pattern method is used to generate the A factor curve for SLMCPR protection.

The highest worth rod or gang of rods is chosen as the error rod (rods) in the Rod Withdrawal Error event with a corresponding limiting rod pattern developed which would give the worst thermal limit change upon continuous rod withdrawal. This worst condition result is then used to define the rod block setpoint based on the concept that no rod withdrawal case will give a worse result; this setpoint thus prevents any SLMCPR violation under all circumstances. This same method is used here in determining the bounding A factor for SLMCPR protection. If one develops an A factor which represents the worst thermal limit change condition, then by using this A factor in MCPR protection setpoint algorithm, it will prevent any SLMCPR violation under all circumstances. (A factor is a multiplier to the setpoint itself.) The A factor curve for SLMCPR protection is calculated for a typical 1100 MW reactor and shown at 201 in FIG. 4C.

Referring to FIG. 4B, typical curves relating to rod withdrawal at a selected location within the core are shown. These plots are for various power levels, at 43% core flow.

Referring to FIG. 4C, a group of such curves is shown for an alternate rod location and core flow.

MCPR Protection Algorithm During Core Flow Change Algorithm $$\frac{RBS_o}{LPRM_i} = A_{total,o} \cdot \frac{RMCPR_i}{OLMCPR}$$

$$= A_o A_f \cdot \frac{RMCPR_i}{OLMCPR}$$

$$\frac{RBS_s}{LPRM_i} = A_{total,s} \cdot \frac{RMCPR_i}{SLMCPR}$$

$$= A_s \cdot A_f \cdot \frac{RMCPR_i}{SLMCPR}$$

Where:
$RBS_o$: Operating limit rod block (flow block) setpoint
$RBS_s$: Safety limit rod block (flow block) setpoint
$LPRM_i$: Initial sum of average of four corner LPRMs from B,C,D levels. (See System Algorithm)
$A_o$: Margin factor for operating limit rod block due to rod withdrawal, a known function of rod pull distance. Same $A_o$ as in System Algorithm.
$A_s$: Margin factor for safety limit rod block due to rod withdrawal, a known function of rod pull distance. Same $A_s$ as in System Algorithm.
$RMCPR_i$: Regional initial MCPR. See System Algorithm.
OLMCPR: Same as in System Algorithm.
SLMCPR: Same as in System Algorithm.
$A_f$: Margin factor for rod block due to core flow change, a known function of initial core flow and final core flow.

$$A_f = 1 + f(W_i, W_f), A_f = 1 \text{ if } W_i = W_f$$

where $$f(W_i, W_f) = 1.953 \times 10^{-2}(W_f - W_i) - 1.722 \times 10^{-4}(W_f^2 - W_i^2) + 0.534 \times 10^{-6}(W_f^3 - W_i^3)$$

$A_{total,o}$: Total margin factor that considers both rod pull and flow change for operating limit block
$A_{total,s}$: Total margin factor that considers both rod pull and flow change for safety limit block This algorithm shows that $A_f$ caused by flow change is uniform throughout the whole core. Overall total A factor with combination of rod pull and flow change can be obtained by multiplying the A factor due to rod pull to the A factor due to flow change.

Basis of Algorithm

Since core flow change is in general uniform throughout the whole core, the uniform bundle flow change will cause uniform bundle power change. The ratio of MCPR change is also uniform under specific power and flow conditions. This gives a constant $A_f$ for all core regions at specific power and flow conditions. $A_f$ value at specific power and flow conditions is proportional to the ratio of the critical power change only. This relationship is shown as follows, by definition of $A_f$:

$$\frac{LPRM_x}{LPRM_i} = A_f \cdot \frac{CPR_i}{CPX_x}$$

where LPRM represents the sum of the B, C, D LPRM $$\frac{LPRM_x}{LPRM_i} = A_f \cdot \frac{CP_i/P_i}{CP_x/P_x} = A_f \cdot \frac{CP_i}{CP_x} \cdot \frac{P_x}{P_i}$$

where CP represents the bundle critical power under specific flow condition (and power condition).

$$A_f = \frac{LPRM_x}{LPRM_i} \cdot \frac{P_i}{P_x} \cdot \frac{CP_x}{CP_i}$$

Assuming $$\frac{LPRM_x}{LPRM_i} = \frac{P_x}{P_i}$$

Then $$A_f = \frac{CP_x}{CP_i}$$

This shows that $A_f$ equals approximately the ratio between the final critical power after flow change and the initial critical power before flow change. If taking the most conservative $A_f$ value from various power conditions at a constant core flow, an $A_f$ curve as a function of core flow only can be established, which will follow the same trend as the change ratio of the bundle critical power. Since the critical power increases as flow increases. $A_f$ is always greater than 1. At lower flow $A_f$ is larger since critical power change ratio is larger: at higher flow $A_f$ is smaller since critical power change ratio is smaller. $A_f$ can be established as $$A_f = a + f(W_f, W_i); A_f = 1 \text{ if } W_f = W_i$$

where $W_f$ and $W_i$ are the final and initial core flow.

$A_f$ due to core flow change is an independent factor that is not changed during rod withdrawal operation. A total A factor that represents a combined operation of both rod withdrawal and flow change can be obtained by multiplying the $A_f$ due to flow change by the A factor due to rod withdrawal.

Determination of $A_f$ Function

The exact $A_f$ value is determined based on a 10% core flow change operation (with no rod pull) performed at each typical operating point. The $A_f$ values for 10% flow change are shown in FIG. 5A, as a function of initial core flow.

Based on the $A_f$ results, it shows that at any fixed core flow $A_f$ at lower power is always lower. Since lower $A_f$ represents more conservative $A_f$ (i.e., rod block setpoint is lower), the average $A_f$ values with a margin at these lowest power conditions are taken to construct an $A_f$ function which depends only on core flow. The margin used is the 95% probability and 50% confidence. This curve is shown in FIG. 5A. It is also stated as follows:

$$\frac{d}{dW}(A_f - 1) =$$

$$1.953 \times 10^{-2} - 3.544 \times 10^{-4} W + 1.602 \times 10^{-6} W^2$$

By integrating the above equation, one obtains $$A_f - 1 = 1.953 \times 10^{-2}(W_f - W_i) - 1.772 \times 10^{-4}(W_f^2 - W_i^2) + 0.534 \times 10^{-6}(W_f^3 - W_i^3)$$

This relationship is included in the rod block algorithm due to core flow change to determine $A_f$ as a function of initial and final core flow. It is plotted in FIG. 5B with initial flow being 40%, 50%, and 60%.

Those having skill in the art will realize that these resultant equations are capable of rapid solution in a programmed microprocessor.

Algorithm to Prevent Fuel Mechanical Thermal Limit Violation During Rod Withdrawal There are two operating limits related to fuel mechanical thermal limit. One is the maximum fuel rod power density, or maximum linear heat generation rate (MLHGR), which mainly monitors the limit for prevention of cladding rupture due to pellet expansion stress. The other one is the maximum average planar linear heat generation rate, or MAPLHGR, which has to be maintained to limit cladding temperature during a loss of coolant accident (LOCA). It has been demonstrated during this study that the LPRM response to the regional maximum average planar linear heat generation rate change due to rod withdrawal is almost identical to the LPRM response to the regional MLHGR change. The MAPLHGR limit is derived from fuel rod heat flux limit with fuel rod local peaking factors taken into consideration. The MAPLHGR limit and the MLHGR limit are closely related, and are in general differed by a few percent. Due to the almost identical LPRM responses to changes of the two limits, either limit can be used in the ATLM rod block logic for fuel mechanical limit protection. With bounding conservative margins added to the B values, as to be explained later, the algorithm based on MAPLHGR or MLHGR will adequately cover both MAPLHGR and MLHGR fuel mechanical limits protection.

In the core monitor model, the average planar LHGR is calculated by the model and the MAPLHGR limit is an input value being a function of fuel type and bundle exposure. The ratio of the two, called MAPRAT. is also calculated by the model and is readily obtainable through output editing. This MAPRAT value is to be used by the algorithm for rod block setpoint calculation. Also, since the overpower condition during worst transient at off-rated condition can be more severe than rated condition, a power and flow dependent multiplier factor has to be included in the MAPLHGR or MLHGR limit for off-rated condition applications.

MAPLHGR Algorithm Equation

The equation that governs the relationship between the MAPLHGR limit and the processed LPRM outputs are described as follows for each fuel monitoring region:

$$\frac{RBS_m(X)}{LPRM_i(X)} = B_i(X) \cdot \frac{M_p}{MAPRAT(X)}$$

Where:
$RBS_m(X)$: MAPLHGR operating limit rod block setpoint at LPRM level X
$LPRM_i(X)$: Initial average of the four LPRMs (level X) at the four corners of each 16 bundle fuel region. The region monitored by the X level LPRMs is the region covered up to 1.5 ft above the LPRM and 1.5 ft below the LPRM. (For peripheral region, there may be less than 4 LPRMs which cover a region with fewer bundles.)

$B_m(X)$: Margin factor for MAPLHGR operating limit rod block for X level LPRMs. This factor is a function of power and rod position.

$M_p$: Off-rated power factor to consider overpower condition during worst transient at off-rated condition. This is a known function of power.

$MAPRAT_i(X)$: Regional initial maximum MAPRAT for level X. i.e., the maximum MAPRAT of the 16 bundles with the 3 feet section covered by the X level LPRMs. (Less than 16 bundles for peripheral regions.) $MAPRAT_i$ is known input from the core monitor model.

Basis of Algorithm

The average planar LHGR (APLHGR) is a calculated bundle average fuel pellet power density, expressed in term of kw/ft. The maximum APLHGR in the region monitored by the LPRM can be assumed to be proportional to the LPRM output that represents neutron flux level, or, $$LPRM \propto RAPLHGR$$

where RAPLHGR is the regional maximum APLHGR. For two different power levels:

$$\frac{LPRM_i}{LPRM_j} = \frac{PAPLHGR_i}{RAPLHGR_j}$$

When a rod is being withdrawn next to a LPRM string, the true fuel power density of the fuel section around this rod next to the LPRM string are under measured. For two power conditions with one being the limiting condition, one has $$\frac{LPRM_{limit}}{LPRM} = B \cdot \frac{RAPLHGR_{limit}}{RAPLHGR}$$

Where B is the under-measure factor. If representing the right-hand side values in MAPRAT, i.e., dividing the RAPLHGR by MAPLHGR, one has $$\frac{LPRM_{limit}}{LPRM} = B \cdot \frac{MAPRAT_{limit}}{MAPRAT}$$

Where $B$ = Function (power, flow, rod position)
Fuel region with rod withdrawal $B = 1$
Fuel region with no rod withdrawal Since MAPLHGR is power and flow dependent based on over-power conditions during worst transient at off-rated conditions, an off-rated power multiplier factor for MAPLHGR ($M_p$) has to be included in the above equation for off-rated condition setpoint calculations. Or $$\frac{RBS_m}{LPRM_i} = B \cdot \frac{MAPRAT_{limit}}{MAPRAT_i} =$$

$$B \cdot \frac{1}{MAPRAT_i}, \text{ rated condition}$$

and, $$\frac{RBS_m}{LPRM_i} = B \cdot \frac{M_p}{MAPRAT_i}, \text{ off-rated condition}$$

B has to be determined to cover all power and flow conditions and for all four LPRM level applications.

B-Value Determination

The strategy of determining the B-value is similar to the method of determining A-factor in the MCPR setpoint algorithm. For any power and flow condition, the relationship between the LPRM output and the local regional maximum APLHGR depends mainly on the withdrawal position of the adjacent control rod in this region. B-values are different for different power and flow conditions. To obtain the dependence relationship of B-values on core power, flow, and control rod position, typical power and flow conditions from the same family of operating conditions used in MCPR algorithm are selected and used. These typical cases are rod withdrawal cases with higher worth gang of rods being pulled from typical operating conditions which cover the entire power/flow operating region.

Based on the above cases, a family of B-value curves are developed as a function of rod withdrawal position for the various operating conditions, for each of the four regions monitored by LPRM level A, B, C and D. The exemplary results are shown in FIGS. 6A and 6B. The results show that in general B-values vary depending on the distance between the rod position to the elevation of the concerned LPRM. For an initially deep rod. B-value tends to be close to one until the control rod is withdrawn to the vicinity of the LPRM elevation, where B-value starts to decrease. For example, for LPRM C level, the B-value drops to as low as 0.84.

After the control rod is withdrawn to a position very close to the LPRM elevation, the B-value starts to increase back to near one, where the control rod is away from the LPRM. This is due to the control rod density effect described earlier. However, if the control rod initial position is very close to the LPRM or at the LPRM elevation, then the B-value no longer decreases with further rod pull. Instead, it stays close to one until the rod is completely withdrawn. Also, the results show that for higher core power conditions, the B-values stay at higher values even at rod position close to LPRM. This makes it possible to select two different set of bounding B-values for two different power ranges.

Based on the bounding case results, a set of very conservative bounding margin factor B-value curves are derived for each LPRM level application. This is shown in solid line and in dashed line in FIGS. 6A and 6B. Solid line is to be applied in low power range (below 65% power); dashed line is to be applied to high power range (above 65% power). It has been demonstrated that these set of B-value margins can appropriately accommodate a random 15% probability failure of LPRMs sensors.

MLHGR Algorithm Equation

The equation that governs the relationship between the MLHGR limit and the processed LPRM outputs is similar to MAPLHGR algorithm equation and is described as follows for each fuel monitoring region:

$$\frac{RBS_m(X)}{LPRM_i(X)} = B_m(X) \cdot \frac{M_p X \; 13.4}{KW/FT_i(X)}$$

Where:

$RBS_M(X)$=LHGR operating limit rod block setpoint at LPRM Level X $LPRM_i(X)$=Initial average of the four LPRMs (Level X) at the four corners of each 16 bundle fuel region. The region monitored by the X level LPRMs is the region covered up to 1.5 ft. above the LPRM and 1.5 ft. below the LPRM. (For peripheral region, there may be less than 4 LPRMs which cover a region with fewer bundles.)

$B_M(X)$: Margin factor for MLHGR operating limit rod block for X level LPRMs. This factor is a function of power and rod position.

$M_P$: Off-rated power factor to consider over power condition during worst transient at off-rated condition. This is a known function of power. If 13.4 KW/FT is used as the operating limit for all power condition, then $M_P = 1$.

$KW/FT_i(X)$: Regional initial maximum KW/FT for level X, i.e., the maximum KW/FT of the 16 bundles within the 3 feet section covered by the X level LPRMs, (less than 16 bundles for peripheral regions.) $KW/FT_i(X)$ is known input from the core monitor.

Basis of Algorithm

The basis of MLHGR algorithm is similar to that of the MAPLHGR algorithm. The maximum LHGR in the region monitored by the LPRM can be assumed to be proportional to the LPRM output that represents neutron flux level, or, $$LPRM \propto M. \; KW/FT$$

Where M. KW/FT is the regional maximum KW/FT. For two different power levels:

$$\frac{LPRM_i}{LPRM_j} = \frac{KW/FT_i}{KW/FT_j}$$

When a rod is being withdrawn next to a LPRM string, the true fuel power density of the fuel section around this rod next to the LPRM string is under measured. For two power conditions with one being the limiting condition, one has $$\frac{LPRM_{limit}}{LPRM} = B \frac{KW/FT_{limit}}{KW/FT}$$

Where $B$ is the under-measure factor.
$B$ = Function (power, flow, rod position)
Fuel region with rod withdrawal
$B = 1$
Fuel region with no rod withdrawal If an off-rated power multiplier factor for MLHGR ($M_P$) is included, then $$\frac{RBS_M}{LPRM_i} = B \cdot M_P \frac{KW/FT_{limit}}{KW/FT_i} = B \cdot \frac{M_p \; 13.4}{KW/FT_i}$$

B has to be determined to cover all power and flow conditions and for all four LPRM level applications.

B-Value Determination

The Method of determining B value for MAPLHGR algorithm is followed to determine B value for MLHGR algorithm. Same typical cases of rod withdrawal cases are used. Based on the above cases, a family of B-value curves is developed as a function of rod withdrawal position for the various operating conditions, for each of the four regions monitored by LPRM level A, B, C, and D. The results are found to be almost identical to the results of MAPLHGR B values.

MLHGR and MAPLHGR Algorithm due to Core Flow Change

The B-Value to monitor KW/FT change during core flow change is evaluated. From theoretical point of view, it is concluded that the B-value during flow change is always one, for the following reasons:

a) Flow change is a core-wide uniform change, the resultant power change is uniform and proportional to initial power core-wide.

b) The bundle power change, or KW/FT change is uniform and proportional to the initial bundle power, independent in general of bundle location.

c) The LPRM change, which monitors regional power change is proportional to the power (or KW/FT) change. This gives a B-value of one.

The above conclusion is confirmed and verified by 3 dimensional core monitor model analysis. It is determined that the B-value of MLHGR algorithm due to flow change is one, regardless of power/flow conditions.

Algorithm of Self Test Unit

In addition to the built-in self test feature of the hardware, the self test unit has four test functions in both channels:

a) Calculated versus Measured Plant Parameters

Receive inputs of measured data of reactor pressure, feedwater flow, feedwater temperature, core flow, reactor power (APRM), and selected LPRMs. Compare these data with calculated data at the time when the monitor results are downloaded (including the above parameters). Issue rod block and warning if the two sets of data are different by a preset uncertainty factor.

b) ATLM Algorithm Test

For either channel, receive setpoint calculation result from the other channel. Compare this result with the result of own channel. Issue rod block and warning if the two do not agree by a preset error margin.

c) Overall Functional Test (Manual)

Upon initiation of test demand by the operator, a simulated high LPRM ratio signal is transmitted to the algorithm/comparator units to generate a trip signal.

d) Setpoint Calculation Test (Manual)

Upon initiating test demand, a display of a standard calculation data is available for setpoint calculation check as an ATLM functional test.

System Logic a) Data Input

Regional (16 bundle block or less) thermal limit data calculated by on-line monitor are downloaded to the ATLM processor memory automatically when no active rod movement is in progress. Operating limit table (a function of power and flow), safety limit MCPR value, and A-factor curves as a function of relative rod pull distance are manually entered at the beginning of cycle before startup. APRM (reference), core flow, LPRM readings, rod positions are scanned continuously and input to ATLM processor memory, MCPR, processed LPRM reading, rod position are two-dimensional matrices, (power density in KW/FT, processed LPRM reading for KW/FT monitoring are three-dimensional matrices.)

B-factors tables are manually entered at the beginning of cycle before startup. Regional maximum KW/FT data or MAPRAT data (three dimensional) calculated by the on-line monitor are downloaded to the processor memory.

b) Initialization

Upon new monitor calculation and data download, all A-factors are initialized to one, all relative rod pull distances initialized to zero, and all rod positions are renamed as initial positions. Upon rod selection, selected rod(s) I.D., its position, and associated region(s) are identified and recorded. At beginning of first rod pull after a monitor data download, all input thermal limit and LPRM data are renamed as initial values, e.g., $LPRM_i$, $RMCPR_i$. The $LPRM_i$ and $RMCPR_i$ values are kept unchanged until the next monitor data update and download. A-factor is only dependent upon rod position difference between current position and initial position of the same rod(s) since the last monitor data update.

All B-factor values are initialized to their designated values as a function of the initial rod position upon new monitor calculation and data download. All input KW/FT or MAPRAT data are renamed as initial values.

Algorithm Calculation Time Cycle

The algorithm will use the most recently scanned values of rod position and OLMCPR for calculation. The calculation will be on the order of 100 ms to 200 ms. The actual calculation (i.e., CPU) time will be much less than 100 ms, due to the simplicity of the algorithm and the current micro-processor capability. Algorithm calculation is initiated at the beginning of first rod pull and terminated a few minutes after rod motion stops. (Proposed time is 5 minutes.) With no active rod movement in progress, the algorithm calculation will still be performed periodically with a larger time cycle to monitor margin to OLMCPR and/or power density limit, caused by flow change and/or xenon variation.

d) Table Look Up

A-factor and OLMCPR are determined through on-line table lookup, with the former as a function of relative rod pull distance and the latter as a function of reactor power (APRM) and core flow. A-factor is applied to the algorithm based on relative rod pull distance since the last monitor update, for all control rods being pulled and for all corresponding fuel regions being affected.

B-factor values and $M_p$ values are determined through on-line table lookup, with the former as a function of rod position and power, and the latter as a function of reactor power (APRM) and core flow.

e) 3D Monitor Result Download

Monitor calculation result is downloaded automatically upon completion of the calculation when there is no active rod movement and after completion of successful self test. The monitor calculation and download is always carried out at the end of a set of rod withdrawal motion. This will avoid any error introduced due to continuous rod motion during monitor calculation. For operating limit MCPR and KW/FT (or MAPRAT) setpoint calculation, the monitor result is automatically transferred into the algorithm input data entry memory after self test completion. For safety limit MCPR setpoint calculation, operator acknowledgement of the correctness of the monitor thermal limit data is required before this data is transferred into the algorithm input data entry memory. The SLMCPR setpoint thermal limit input update is required if the SLMCPR setpoint exceeds the operating limit MCPR setpoint.

f) Rod Block

If any single setpoint is exceeded by the instantaneously scanned and processed LPRM values, a rod block signal is generated by the comparator unit and sent to the RCIS for action. However, this rod block signal can be reset and cleared if a new setpoint calculation shows the setpoint is no longer exceeded. Other rod(s) then can be selected and withdrawn, either automatically through programmed rod withdrawal sequence or manually. If the number of failed LPRM detectors exceeds an allowed limit (defined in next section), a rod block signal will be issued (by RCIS).

g) Rod Block Reset

For rod block on SLMCPR, it cannot be reset either automatically or manually. Under this condition, operation must be transferred to manual if it is in auto. It cannot go back to auto until the OLMCPR rod block function is operational. The operator can then manually reset the block only if further setpoint calculation shows the instantaneous ATLM signal no longer exceeds this SLMCPR setpoint. For rod block on OLMCPR, it can be reset only if further setpoint calculation shows the instantaneous ATLM signal no longer exceeds the setpoint. For rod block on OLMCPR, the reset clearance can be done automatically or manually. For auto reset, the blocked rod is first to be inserted slightly (1% stroke). This logic can be programmed into the auto rod motion logic.

h) Flow Block & Reset

If the setpoint calculated by the flow block algorithm is exceeded by the LPRM values, a flow block signal is sent to the recirculation flow control system. It can be cleared by the operator action if subsequent ATLM readings do not exceed the setpoint.

i) Self Test

There are four functions in the self test unit: test of calculated versus measured plant parameters, test of ATLM algorithm performance, manual functional test, and test display check. If any one of the first two tests fails, rod block signal and warning are issued. The functional tests will always issue rod block and warning.

j) 3D Monitor Calculation Frequency

During constant power operation, the monitor calculation frequency can be set at every 1 to 2 hours. During power change operation, the frequency can be set at once for every 10% power change or once every 20 minutes, whichever is sooner. Monitor calculation also can be demanded by the plant's power generation and control system automatically when all rod withdrawals are temporarily inhibited by the ATLM logic due to conservatism in A-factors. A new monitor update will clear all rod blocks under this condition. It can also be demanded anytime by operator request.

LPRM Failures

Failure of LPRM chambers will affect the processed LPRM readings of the ATLM which in turn will affect proper rod block setpoint. Allowable failure rate thus must be established for the designed LPRM monitoring assignment. The final bounding A/B factors include a margin that cover an average 15% random LPRM failure rate.

The following logic is implemented that specifies allowable failure rate for any 4 LPRM strings surrounding a 16 bundle block, if the failure number of LPRM exceeds 50% out of the designed sensor number for monitoring from these 4 strings then this region output will issue rod block. However, such rod block can be cleared with this region bypassed. During any ganged rod withdrawal operation which covers either four or eight fuel regions, up to three regions can be bypassed and still allow active rod pull in these regions with the ATLM operational. This has taken gang rod operation into consideration. Specifically, for KW/FT monitoring this means at least 2 out of 4 LPRM sensors on each level should be operational, otherwise, up to three regions can be bypassed during gang rod operation.

We claim:

1. A method of blocking in real time power increases on a reactor core as a function of minimum critical power ratio having discrete monitored rod bundle groups comprising the steps of:
   providing initial local power range monitor readings to obtain reactor local power data in all core discrete monitored rod bundle groups via a plurality of vertical strings of local power range monitors, each string including a plurality of power monitors disposed at differing elevations;
   providing control rod position data from a group of control rods having positions of penetration with respect to said rod bundle group for the control of nuclear reaction in said rod bundle group;
   providing initial flow rate through said reactor core;
   providing core average power data in the said reactor core;
   utilizing said core average power data and said initial flow rate to determine operating limit minimum critical power ratio;
   utilizing a reactor thermal limit output model to determine the worst initial regional minimum critical power ratio for said rod bundle group,
   downloading the worst initial regional critical power ratio from the computing model to memory;
   looking up at least one constant which is predetermined as a function of positions of withdrawal of said control rod, said constant constituting a bounding, substantially worst case scenario for all control rod withdrawals from said rod bundle groups;
   computing a setpoint for said local power range monitor output based on said constant, said operating limit minimum critical power ratio, said initial local power range monitor reading, and said worst case initial regional minimum critical power ratio;
   comparing said instantaneous local power range monitor to said setpoint; and
   blocking said power increase responsive to violations of said setpoint.

2. The process of claim 1 and wherein said utilizing step includes:
   utilizing said reactor thermal limit output model to determine the worst initial regional minimum critical power ratio for said rod bundle group
   looking up at least one second constant which is a predetermined function of positions of withdrawal of said control rod, said constant constituting a bounding worst case scenario for all control rod withdrawals from said rod bundle groups;
   utilizing said core average power data and said flow rate to determine safety limit minimum critical power ratio;
   computing a second setpoint for local power range monitor output based on said second constant, said safety limit minimum critical power ratio, said initial local power range monitor reading and said worst case initial regional minimum critical power ratio;
   comparing said instantaneous local power range monitor to said second setpoint;
   and, blocking said power increase responsive to violations of said second setpoint.

3. The process of claim 1 and wherein said blocking said power increase responsive to violations of said setpoint includes a step of blocking rod withdrawal.

4. The process of claim 1 wherein said step of computing a setpoint includes computing a setpoint for each and all of said rod bundle groups; and
   said step of comparing includes comparing said instantaneous local power range monitor to said setpoint for each and all of said rod bundle groups.

5. A method of blocking in real time power increases on a reactor core as a function of maximum linear heat generation rate having discrete monitored rod bundle groups comprising the steps of;
   providing reactor local power data in all core discrete monitored rod bundle groups via a plurality of vertical strings of local power range monitor, each string including a plurality of monitors disposed at differing elevations;
   providing control rod position data from a group of control rods having positions of penetrations with respect to said rod bundle group for the control of nuclear reaction in said rod bundle group;
   providing initial flow rate through said reactor core;
   providing core average power data in the said reactor core;
   utilizing said core average power data and said initial flow rate to determine operating limit maximum linear heat generation rate;
   utilizing a reactor thermal limit output model to determine the worst initial regional maximum linear heat generation rate for said rod bundle group;
   downloading said worst case initial regional maximum linear heat generation rate from the computing model to memory;

looking up at least one constant which is a predetermined function of withdrawal of said control rod; said constant constituting a bounding worst case scenario for all said control rod withdrawals relative to a ratio of said local power data ratio and said worst regional maximum linear heat generation rate ratio for a selected elevation of said rod bundle group;

computing a setpoint for said local power range output based on said constant, said operating limit maximum linear heat generation rate, said initial local power range monitor reading and said worst case initial regional maximum linear heat generation rate;

comparing said instantaneous local power range monitor to said setpoint; and, blocking said power increase responsive to violations of said setpoint.

6. The process of claim 5 wherein said blocking said power increase responsive to violations of said setpoint includes the step of blocking rod withdrawal.

7. The process of claim 5 wherein said blocking said power increase responsive to violations of said setpoint includes the step of blocking flow change.

8. The process of claim 7, wherein for flow change, the setpoint and the algorithm determining said setpoint are valid power block functions.

9. A method, as claimed in claim 5, wherein said step of comparing comprises comparing said instantaneous local power range monitor to said setpoint for each of different selected elevations of each and all of said rod bundle groups.

10. A method of blocking in real time power increases on a reactor core as a function of maximum average planar linear heat generation rates within a reactor core having discrete monitored rod bundle groups comprising the steps of;

providing reactor local power data in all discrete monitored rod bundle groups at selected elevations from a plurality of vertical strings of local power range monitor, each string including a plurality of power monitors disposed at said selected elevations;

providing control rod position data from a group of control rods having positions of penetrations with respect to said rod bundle group for the control of nuclear reaction in said rod bundle group;

providing initial flow rate through said reactor core;

providing core average power data in the said reactor core;

utilizing said core average power data and said initial flow rate to determine operating limit maximum average planar linear heat generation rate;

utilizing a reactor thermal limit output model to determine the worst initial regional maximum average planar linear heat generation rate for said rod bundle group;

downloading the worst initial regional maximum average planar linear heat generation rate;

looking up at least one constant which is predetermined as a function of positions of withdrawal of said control rod; said constant constituting a bounding worst case scenario for all control rod withdrawals relative to a ratio of said local power data ratio and said worst regional maximum average planar linear heat generation rate ratio for a selected elevation of said rod bundle group;

computing a setpoint for said local power range monitors output based on said constant, said operating limit maximum average planar average linear heat generation rate, said initial local power range monitor reading and said worst case initial regional maximum average planar linear heat generation rate;

comparing said instantaneous local power range monitor reading to said setpoint; and, blocking said power increase responsive to violations of said setpoint.

11. A method, as claimed in claim 10, wherein said step of comparing comprises comparing said instantaneous local power range monitor reading to said setpoint for each of different selected elevations of each and all of said rod bundle groups.

12. A method, as claimed in claim 10, wherein said step of blocking said power increase comprises blocking withdrawal of said control rods.

13. The process of claim 10 wherein said blocking said power increase responsive to violations of said setpoint includes the step of blocking flow change.

14. The process of claim 13, wherein for flow change, the setpoint and the algorithm determining said setpoint are valid power block functions.

15. A method of blocking in real time power increases on a reactor core as a function of minimum critical power ratio having discrete monitored rod bundle groups comprising the steps of;

providing initial local power range monitor readings to obtain reactor local power data in all core discrete monitored rod bundle groups via a plurality of vertical strings of local power range monitors, each string including a plurality of power monitors disposed at differing elevations;

providing control rod position data from a group of control rods having positions of penetration with respect to said rod bundle group for the control of nuclear reaction in said rod bundle group;

providing initial flow rate through said reactor core;

providing core average power data in said reactor core;

utilizing said core average power data and said initial flow rate to determine operating limit minimum critical power ratio;

utilizing a reactor thermal limit output model to determine the worst initial regional minimum critical power ratio for said rod bundle group;

downloading the worst initial regional minimum critical power ratio from the computing model to memory;

looking up at least one constant which is a predetermined function of said initial flow rate and said instantaneous flow rate of the reactor core, said constant constituting a bounding case relative to a ratio of said local power data ratio and a ratio of said critical power ratio, for all rod bundle groups under a plurality of power and flow conditions;

computing a setpoint for said local power range monitor output based on said constant, said operating limit minimum critical power ratio, said initial local power range monitor reading and said worst case initial regional minimum critical power ratio;

comparing said instantaneous local power range monitor to said setpoint; and, blocking said power increase responsive to violations of said second setpoint.

16. The process of claim 15 and wherein said utilizing step includes:
   utilizing said reactor thermal limit output model to determine the worst initial regional minimum critical power ratio for said rod bundle group;
   looking up at least one second constant which is a predetermined function of positions of withdrawal of said control rod, said constant constituting a bounding worst case scenario for all control rod withdrawals from said rod bundle groups;
   utilizing said core average power data and said flow rate to determine safety limit minimum critical power ratio;
   computing a second setpoint for local power range monitor output based on said second constant, said safety limit minimum critical power ratio, said initial local power range monitor reading and said worst case initial regional minimum critical power ratio;
   comparing said instantaneous local power range monitor to said second setpoint;
   and blocking said power increase responsive to violations of said setpoint.

17. A method, as claimed in claim 15, wherein said step of comparing comprises comparing said instantaneous local power range monitor to said setpoint for each of said rod bundle groups.

18. A method, as claimed in claim 15, wherein said step of blocking said power increase responsive to violations of said setpoint includes the step of blocking flow change.

* * * * *